US008472753B2

(12) United States Patent
Bucha et al.

(10) Patent No.: US 8,472,753 B2
(45) Date of Patent: Jun. 25, 2013

(54) METHOD AND SYSTEM OF ADAPTIVE REFORMATTING OF DIGITAL IMAGE

(75) Inventors: Victor Bucha, Moscow (RU); Ilia Safonov, Moscow (RU); Michael N. Rychagov, Moscow (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 1218 days.

(21) Appl. No.: 12/342,515

(22) Filed: Dec. 23, 2008

(65) Prior Publication Data

US 2009/0180713 A1 Jul. 16, 2009

(30) Foreign Application Priority Data

Jan. 10, 2008 (RU) ................................ 2008-100088
Nov. 21, 2008 (KR) ........................ 10-2008-116516

(51) Int. Cl.
*G06K 9/32* (2006.01)
*G09G 5/00* (2006.01)
(52) U.S. Cl.
USPC .......................................... 382/298; 345/660
(58) Field of Classification Search
None
See application file for complete search history.

(56) References Cited

U.S. PATENT DOCUMENTS

| 5,666,441 A | * | 9/1997 | Rao et al. | 382/203 |
| 2004/0013314 A1 | * | 1/2004 | Peli | 382/254 |
| 2008/0219587 A1 | * | 9/2008 | Avidan et al. | 382/276 |
| 2008/0267443 A1 | * | 10/2008 | Aarabi | 382/100 |
| 2011/0211771 A1 | * | 9/2011 | Rubenstein et al. | 382/299 |

OTHER PUBLICATIONS

Kluever, "Intro to Computer Vision: Automatic Image Resizing", 2007, Rochester Institute of Technology, pp. 1-26.*
Shai Avidan, "Seam Carving for Content-Aware Image Resizing", 2007, ACM Trans. Graph. 26, pp. 1-9.*

* cited by examiner

*Primary Examiner* — Andrew W Johns
*Assistant Examiner* — David F Dunphy
(74) *Attorney, Agent, or Firm* — Stanzione & Kim, LLP

(57) ABSTRACT

Method and system of adaptive reformatting of digital photos and document image. The method includes selecting a rule of calculation of function of value for a pixel depending on results of analyzing an image, generating a map of value and a map of history, changing a size of the image by adding/removing at least one found path by means of interpolation, and repeating generation of the maps of values and history and change of a size of the image until a demanded size of the image is received or a sum of path values exceeds a predetermined threshold.

19 Claims, 22 Drawing Sheets

FIG. 16
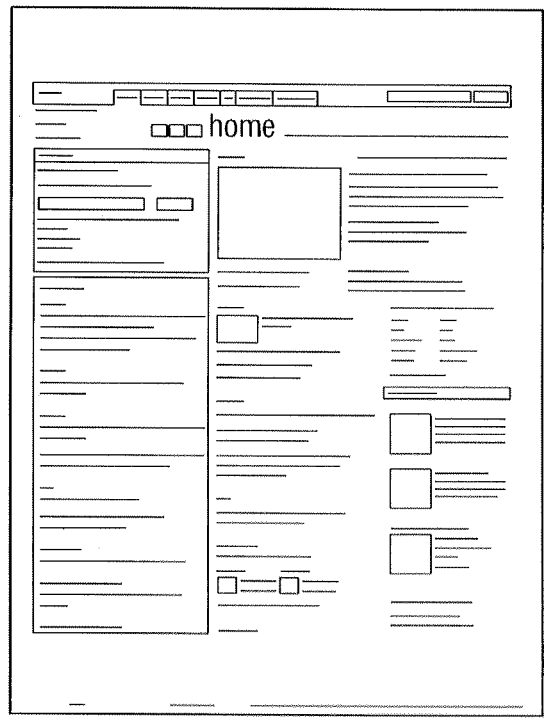
Original image
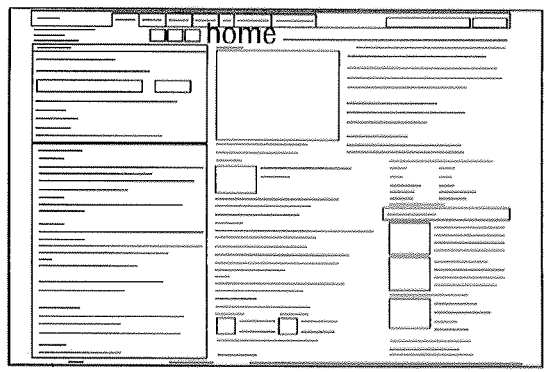
Reformatting 50% height
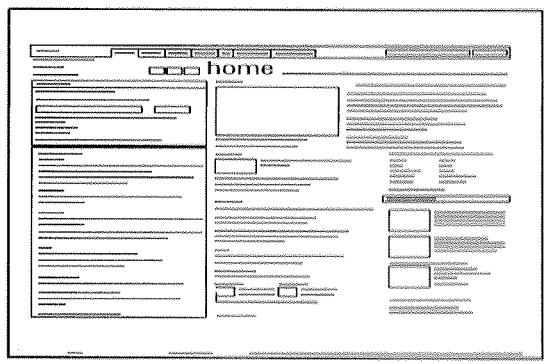
Interpolation 50% height FIG. 17
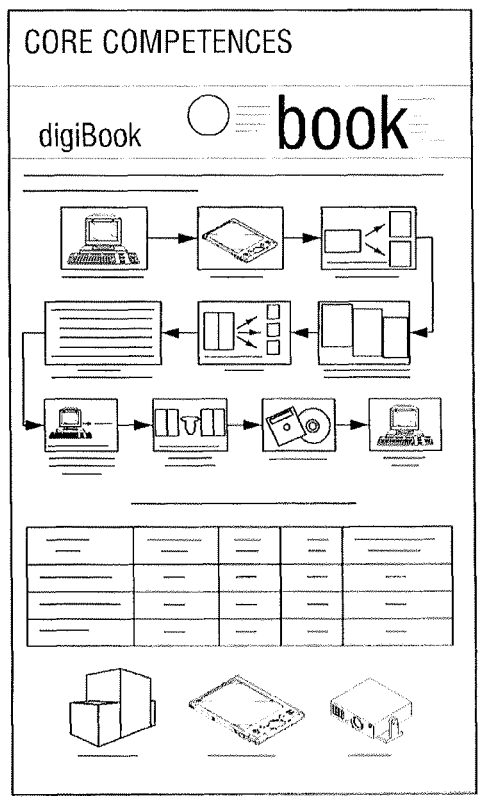
Original image
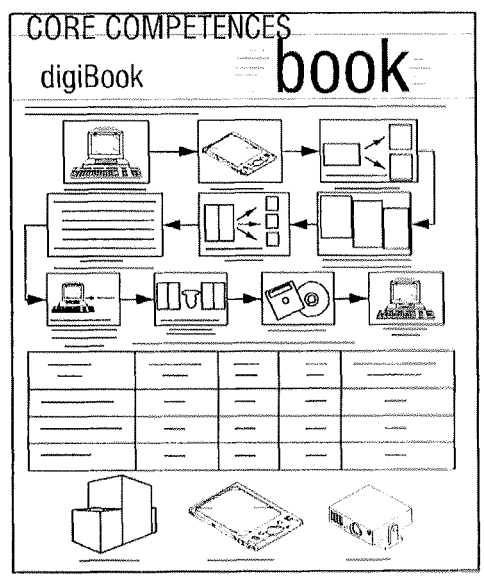
Reformatting 70% height
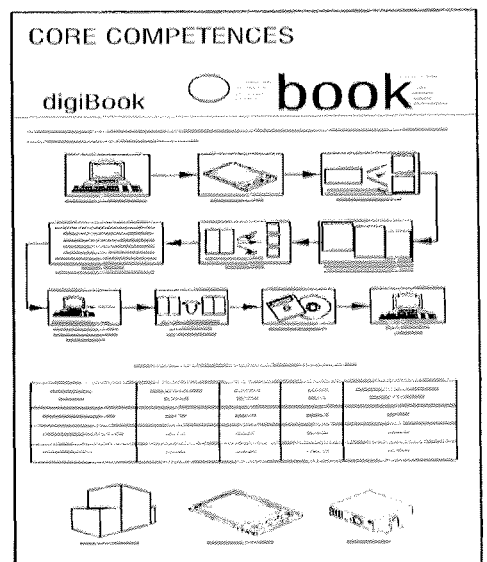
Interpolation 70% height FIG. 18
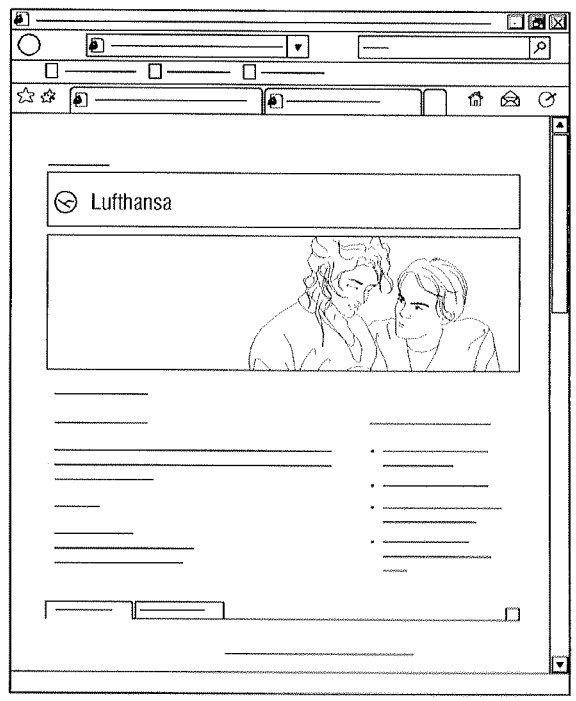
Original image
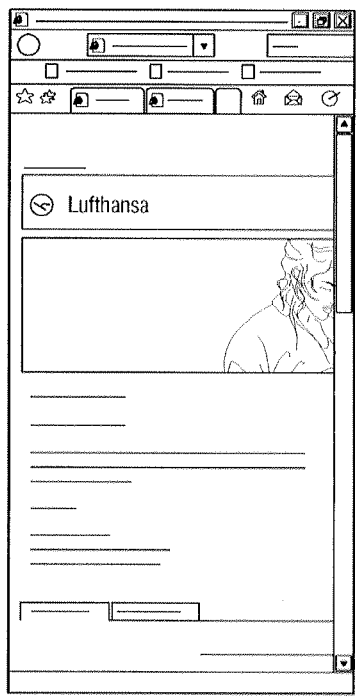
Reformatting 50% height
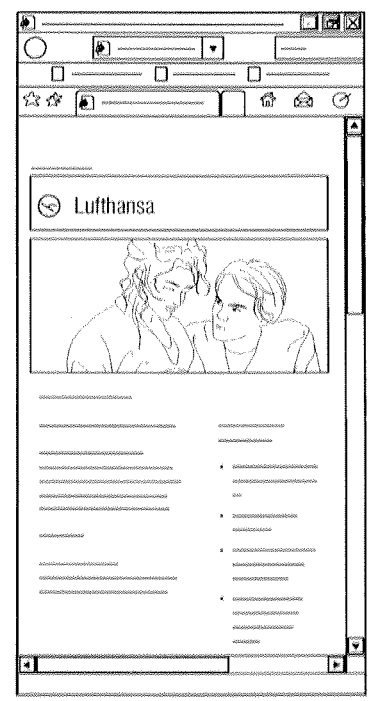
Reformatting 50% height

FIG. 19
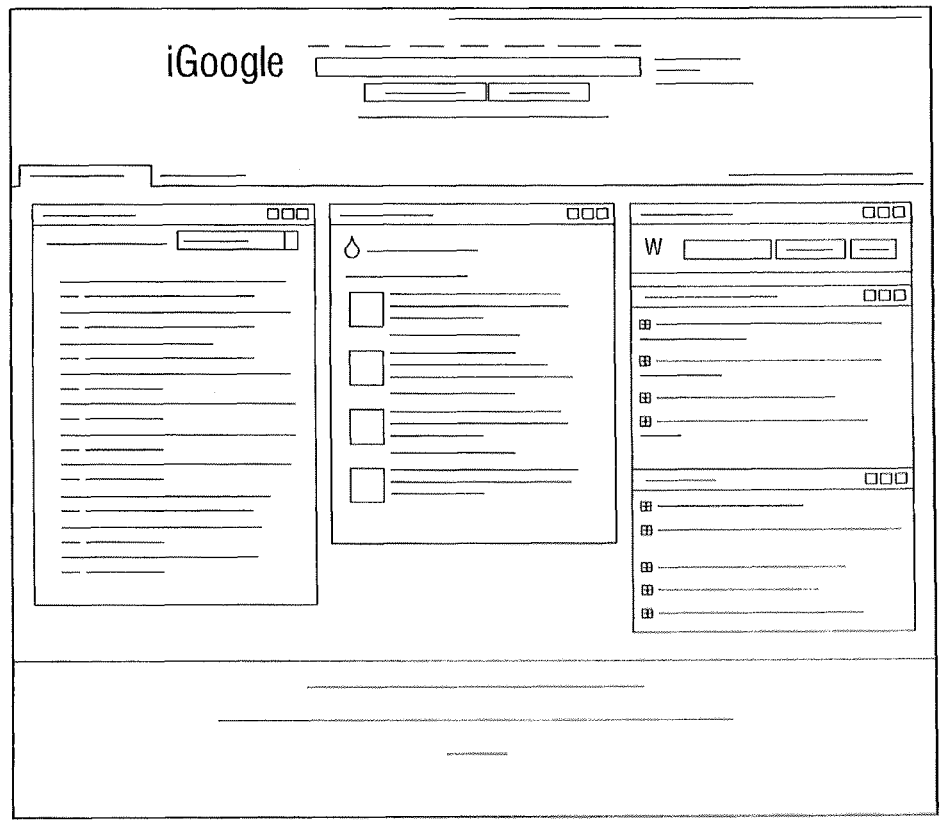
Original image
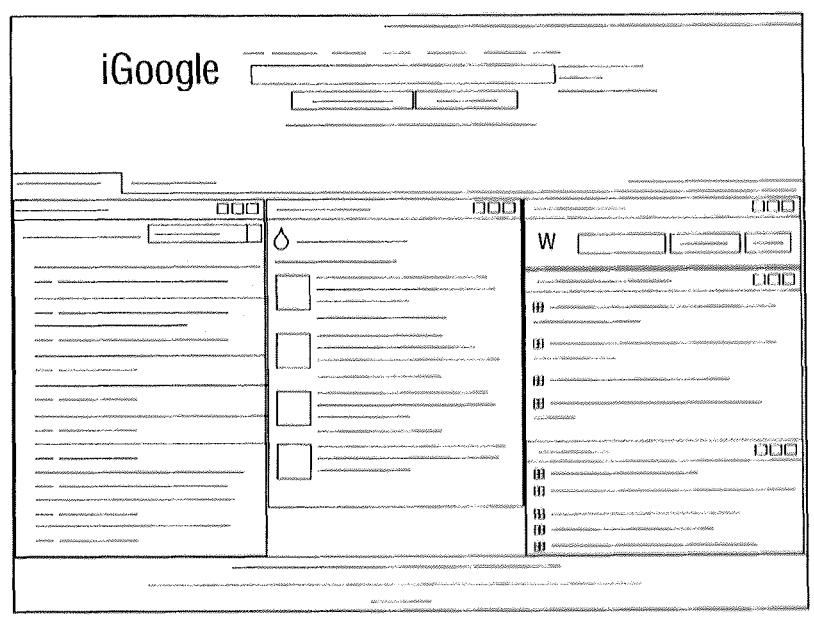
Reformatting the image 86% width 73% height FIG. 20
Original image
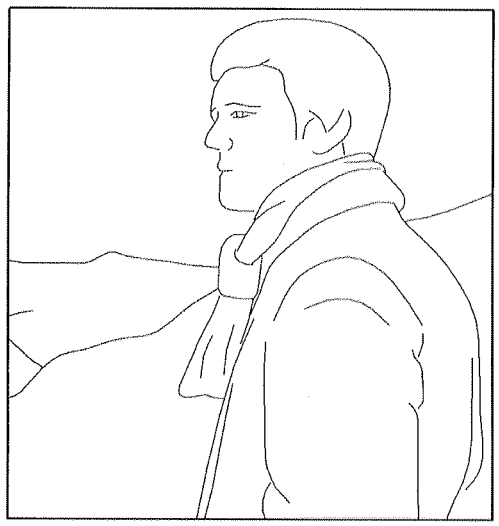
Image reformatting 58% width
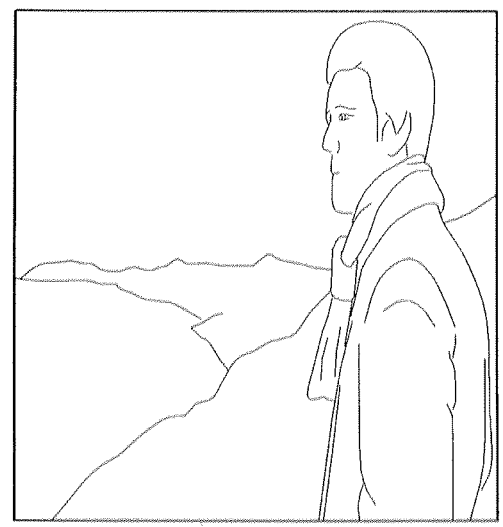
Interpolation 58% width FIG. 21
Original image 4:3
Reformatting to 3:2
Framing 3:2

FIG. 22
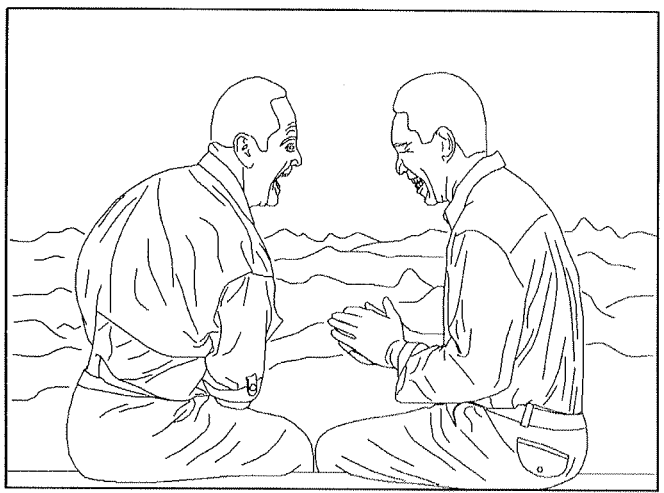
Original image 4:3
Reformatting to 3:2
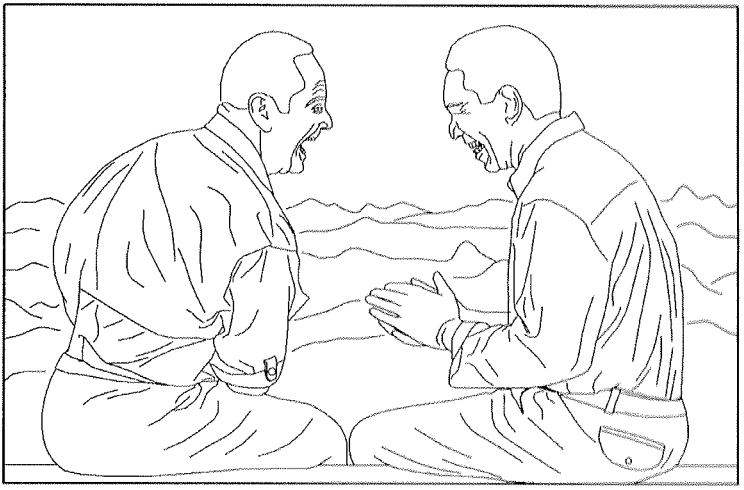
Framing 3:2

FIG. 23
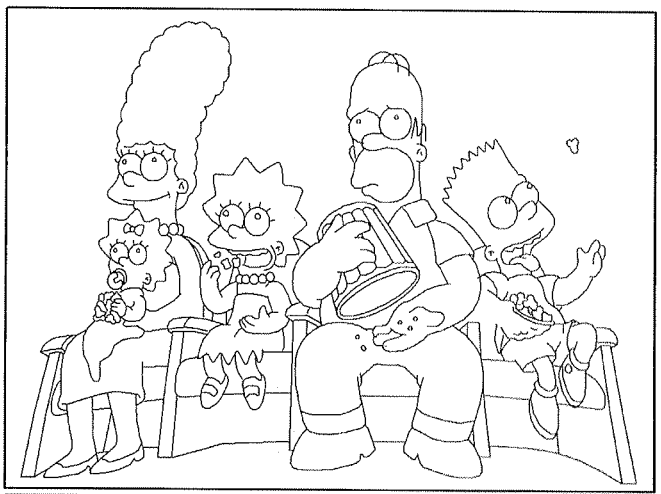
Original image 4:3
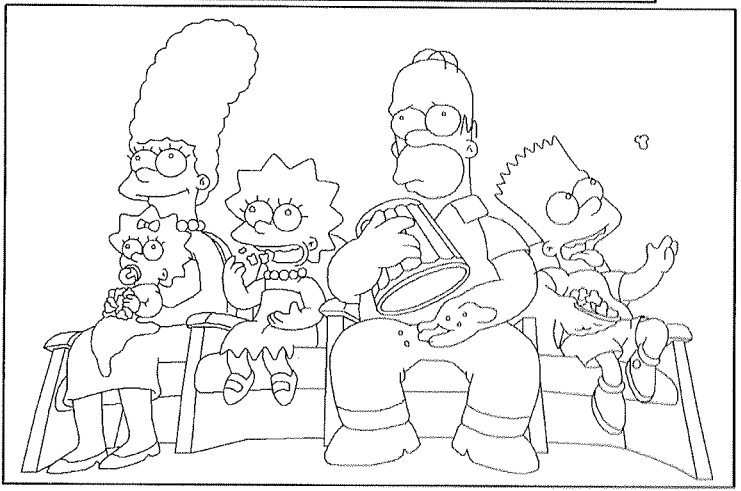
Reformatting to 3:2
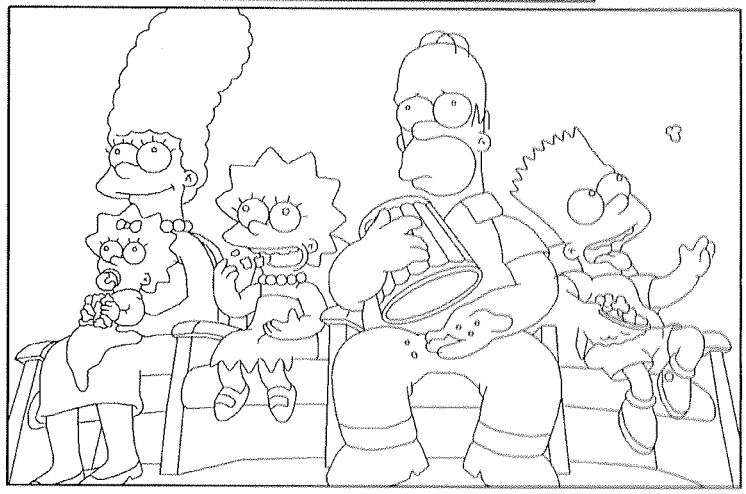
Framing 3:2

METHOD AND SYSTEM OF ADAPTIVE REFORMATTING OF DIGITAL IMAGE

CROSS-REFERENCE TO RELATED APPLICATIONS

This application claims priority under 35 U.S.C. §119 (a) from Russian Patent Application No. 2008100088, filed on Jan. 10, 2008, in the Russian Patent Office, and Korean Patent Application No. 10-2008-116516, filed on Nov. 21, 2008, in the Korean Intellectual Property Office, the disclosures of which are incorporated herein by reference in their entireties.

BACKGROUND

1. Field of the Invention

The present general inventive concept relates to image processing, and more particularly, to a method of changing size/format of a digital image which can be used in editing an image.

2. Description of the Related Art

The technologies and methods relating to known decisions in the field of the image processing include linear scaling, framing, reformatting (retargeting), seam carving, and retouching.

The scaling is generally used to reduce and blow up photos and also is the base operation in processing images which is used at the operations demanding turn, distortion, affine transformations, deinterlacing, and increase of a resolution by time for video sequences. In most cases, the scaling is based on interpolation that finds an intermediate value using an available discrete set of known values.

Above all, the interpolation is used to generates a full-color image from an interleave transfer sensor of a digital camera and a video camera. At the present time, a set of various methods of interpolating an image with various complexities and productivities is provided.

General methods, such as bicubic and bilinear, introduce undesirable artifacts in the image in the field of sharp changes of brightness. Typical artifacts include edge dentation and tailing appearing on the assumption of smoothness of the image, and Gibb's effect shown as a result of exception of high frequency components of a spectrum of the image.

Usually, the two dimensional interpolation is made up a series of one dimensional interpolations in mutually perpendicular directions. For example, U.S. Pat. No. 6,915,026 assumes increase of an image in two stages, i.e., preliminarily calculating and saving coefficients for interpolation first in a vertical direction and then in a horizontal direction. This method has disadvantage that all one dimensional interpolations are made in parallel to coordinate axes of the image and the shown artifacts detect an underlying coordinate grid. Some method assumes a preliminary low frequency filtration in a diagonal direction, but unfortunately, it worsens image quality. U.S. Pat. Nos. 5,719,967 and 6,606,093 describe special methods for suppressing dentation of edges in the image.

The solution described in U.S. Pat. No. 5,446,804 is based on preliminary calculation of sub-pixel map of edges. For each interpolated pixel, there are four nearest neighbors. If any one of next pixels is not cut by edge from the others, a required value is calculated by a sum of these neighbors having weights. If the neighbors are laid on the different sides from the edges, an intermediate value is calculated for a required pixel using two diagonal pixels lying on one side of the edge which is selected based on the map. The required value in a position lying on the other side of a border is replaced with a value received by neighbors and lying on one side of the edge and a calculated size. Such decision allows receiving an image with a sharp border but containing dentate edges.

The methods listed below are to overcome the effect of dentate edges by not using interpolation along the axes lying on coordinate gird and also making two dimensional increase in a vertical direction and in a horizontal direction. The first method described in article Li, X., and M. Orchard, "New Edge Directed Interpolation," IEEE International Conference on Image Processing, Vancouver, September 2000, is based on the assumption of existence of geometrical dualism between covariations co variations of images with a low and high resolution. Protection of edges on the image is caused by adaptability of values of coefficients to interpolation of random directed edge step. This method is intended to increase an image in 2 times. The interpolation includes two processes. First, a pixel having coordinates (2i+1,2j+1) is calculated using a known value in a position (2i,2j). Then, the similar procedure with turn of 45 degrees is made on the other pixels. Each pixel is recognized as a linear combination of the nearest four neighbors and the problem of calculation of coefficients of a linear combination is solved by the method of the least square. This interpolation method provides acceptable results, except for area having a structure in which assumption of geometrical dualism is not hold.

The second method described in article, Yu, X., Morse, B. and T. Sederberg, 2001, Image Reconstruction Using Data-Dependent Triangulation", IEEE Computer Graphics and Application, vol. 21 No. 3, pp. 62-68, achieves a triangulation of a surface in consideration of a brightness value of point height above some zero level. Authors of this method construct a grid of the triangulation and restore an image linear interpolation of intensity inside a triangle. This approach is based on a data dependent triangulation (DDT) method along with different optimization and criterion function. Accordingly, the triangulation protects an edge (sharp change in brightness) and improves image quality. However, the triangulation is iteratively performed and thus is complex in view of calculation.

Sometimes, increasing an image includes two stages. First, an unknown brightness value is calculated and then a post-processing of an image is performed to increase sharpness of the image and improve the edge. For example, U.S. Pat. No. 6,714,688 describes the postprocessing of the image to increase sharpness. First, bilinear interpolation of an image is performed and then a postprocessing of the image is performed using a moving window. The size of the window is detected from the degree by which the window increases. First, a low frequency filter is applied to an inner pixel of the window to select a high frequency component of the image. After that, the high frequency components are summarized with low frequency components having some coefficients detected based on local brightness characteristics. Then, the edges are additionally processed using a special curve indicating change in brightness.

The method described in EP Patent Application No. 1533899 relates to changing a size of a digital image using interpolation along borders and additional postprocessing. First, the image is enlarged in 2n times and then is reduced to a required size. An additional postprocessing of edges is performed. This method provides good results but is complex in view of calculation.

Also, methods of intellectual cropping or framing of an image (photo) are well known, which are intended to change a ratio of geometrical sizes (a ratio of sides) of the image, for example, a ratio of width to height, by cropping bottom and/or top (left and/or right) parts of the image. The term "intellectual" means that a copping of a photo is performed based on analysis of its contents with the purpose to exclude a cropping of an important object captured from a photo. The requirements for change in a ratio of outer sides of the photo appear on a user of a digital camera who wishes to print the digital image. The general digital photo has a ratio of sides of 4:3, wherein a standard sheet of photographic paper has a ratio of sides of 3:2.

There are two approaches to the decision of problem of cropping of a photo, not relating to the analysis of its contents. The first approach is that top and bottom edges of the photo are cropped in the proportion of 50% to 50% or 20% to 80%. Accordingly, if the height of the photo is reduced by 1 cm, horizontal stripes of 5 and 5 mm or 2 and 8 mm in height are cut from the above and the bottom. In many cases, this approach does not cause a cropping of an important object in the photo located at a center of the picture. However, if an object of shooting—for example, a person—is close to the edge of the photo, this approach may cause cropping of parts of the face, the head, or the other parts of the image of the person.

The other approach is to print a photo on a sheet having left and right spaces, not to crop the photo. However, this approach has disadvantage that an area of the sheet of the photographic paper is not completely used.

A main problem in the automatic cropping task includes detection and segmentation of a important object (objects) on the image. The method of detecting an important object is divided into two categories. The method based on processing of pixels is to select a small group of pixels or individual pixels corresponding to parts of an object captured from a photo. For example, a method of selecting edges belongs to such a method. The method based on processing of an area is to select an area corresponding to whole semantically significant objects on the image.

Currently, the automatic cropping task is researched only superficially. Software packages of processing an image in which a function of framing a photo is obviously based on selection of main objects of shooting are well known to the authors.

The program XV (www.trilon.com/xv) has a function of automatically cropping an image which is operated as follows:

1. Boundary lines and columns of the image (top and bottom lines and leftmost and rightmost columns) are selected.

2. Variation in brightness in selected lines and columns is detected. Homogeneous lines and columns in a half-tone image are cut completely. Lines and columns in a color image having a low value of spatial and spectral correlation are cut.

3. Operations 1 and 2 are Repeated as Many Times as Necessary.

Accordingly, the program cuts rather homogeneous areas on edges of the image. It does not define the contents of the image as a whole. In practice, dark edges of a scanned image appearing due to misalignment of original before the scanning are effectively deleted. Unacceptable results often appear due to insufficient analysis of contents of a stage.

In U.S. Pat. No. 5,978,519, a method of cropping an image based on difference of intensity levels is considered. A typical image includes an area of homogeneous intensity and color and an area where intensity and color considerably vary. For example, a portrait usually contains sharp brightness conversion from the main object to the background. In the above described method, the size of the image is reduced and it shares on non-overlapped blocks. An average value and a dispersion of intensity for each block are calculated. A threshold is selected based on distribution of the dispersion in blocks and all blocks having dispersion above the threshold are marked as a interest area. The interest areas are then cut by limiting a rectangle.

It is necessary to note that the above method is effective only in the case where an initial image contains an area where a level of intensity considerably varies and an area having a constant level of intensity. It is expected that efficiency of the method will be compared with the program. This method differs from the program in that the program analyzes uniformity of the image line by line, whereas this method analyzes the image block by block. However, both of the methods are inefficiently operated in an image having a non-uniform background.

The function of intellectual cropping of package "Microsoft Digital Image Suite 2006" has an opportunity to detect a face from a portrait or family photo. The program provides some variants of cropping and then the user selects a necessary ratio of sides from a list of standard format of print. Besides, the user sets the sizes of the image in pixels.

As a whole, almost all existing methods for cropping are developed for certain types of images, including photos of human in a rather simple background, museum photos in which a selected object of shooting is in the center of the image with a homogeneous background, and images of modeling stages with several main subjects of various painting and form. Some of these methods are not intended to initially process a certain image, and efficiency of other methods developed using general principles is shown only on a simple image.

U.S. Pat. No. 6,282,317 describes a method of detecting a main object from an image. This method includes receiving a digital image, extracting areas of form and size corresponding to an object presented on the image, grouping areas in larger areas corresponding to the objects physically connected, extracting at least one structurally selected feature and at least one semantically selected feature for each area, and estimating probability of that area corresponding to the main object for each selected area.

U.S. Pat. No. 6,654,506 described a method of framing a digital image, which includes: inputting a confidential card of the image, a value in each point of this image describing importance of information in a corresponding point of the image; selecting a scaling factor and a window of cropping, clustering areas of the confidential card for definition of areas of a background, a secondary area, and areas of a main object, positioning the window of cropping in the field of the main object so as to make the sum of values of trust inside the window maximal; and cropping the image on the borders of the window of cropping.

The laid-open US patent application No. 2002/0191861 describes automatic and semi-automatic framing of images, and, in particular, a device and a method of capturing and framing images using an electronic camera. The electronic device for framing the images includes tools for processing the image, in particular, an electronic processor and a programmed equipment and/or a software for processing of images. The device identifies features of a composition of the image and finds a similar feature from a number of predetermined features stored in the device, for each selected feature. Then one or several predetermined composition rules, connected with stored features, are selected. The device defines one or several suitable borders for framing, by applying one or several selected composition rules.

A method of controlling fragments of the photo is described in the patent application RU 2005137049. According to this reference, fragments can be received by means of operations of mirror display/duplication of lateral parts of an image.

A laid-open US application No. 2007/0025637 has been partially published earlier in Setlur et al, "Automatic Image Retargeting" ACM International Conference on Mobile and Ubiquitous Multimedia (MUM) 2005, v. 154, pp. 59-68. Authors have described a new approach for automatic reformatting of images (automatic image retargeting), keeping proportions of the important objects of the image at reduction of the sizes of the image. For an initial image and the adjusted format, this method executes following actions. First of all, the initial image is segmented on regions based on analysis of distribution of color and brightness characteristics of the image. Then, the map of importance of pixels/regions of the initial image is created based on the model of human sight and methods of detecting of human faces from digital images. If the adjusted format contains all of the important regions, then the image is framed. Otherwise, the important regions are excluded from the image, which is scaled according to the adjusted format. Then, the important regions are inserted into the modified image, according to a degree of importance and topology. The technology, described above, allows minimizing loss of details of the image and lowering distortions, which are caused by traditional approaches. Also it is necessary to note, that this method makes the important regions closer to each other, keeping their topology.

In the article by Shai Avidan, Ariel Shamir, "Seam Carving for Content-Aware Image Resizing ACM Transactions on Graphics, Volume 26, Number 3, SIGGRAPH 2007", an effective procedure of changing the sizes of the image is described, which considers not only geometrical restrictions, but also the contents of the image. Also, concept and definition of the operator seams scaling (seam carving) are introduced, which is used for reduction and increasing of the image taking into account its content. The seam represents a coherent optimum path from pixels of the image, wherein the optimality is defined using a function of energy of the image. Numerous removal or addition of seams allows achieving change of a format/size of the image.

Recently, there is continuous growth of amount of digital photos and images of documents, which are received and displayed by means of various devices, such as digital cameras, mobile phones, television devices (including devices with high definition), etc. However, the ratio of the geometrical sizes (format) of the digital image does not always correspond to the ratio of the geometrical sizes of area for display. For example, the digital picture has the ratio of the sides of 4:3, and the print is executed on a paper with the ratio of the sides of 3:2. The set of methods is offered for matching the ratio of the sides of a digital picture and area for display. Following methods are most known: scaling, framing and adaptive addition or duplication of parts of the image. These methods are widespread because of their rather simple realizations. However, existing approaches possess two essential disadvantages: reduction of a viewing area due to framing or occurrence of effects of "the stretched image" or "the compressed image".

Algorithms which are constructed based on idea of scaling of the image, change proportions of objects according to change of the ratio of the sides of the image. Technologies of framing are accompanied by losses of parts of the image, and technologies of addition or duplication of parts of the image introduce an image nonexistent in a reality parts and because of it the resulting image is looked artificially in some cases.

Known technical decisions-analogues do not provide adaptive reformatting of digital images depending on their contents. However, results of reformatting strongly depend on the content of the image, and special steps for prevention of changes of proportions and the sizes of the most important objects on the image are required. The most significant objects on digital photos are images of human, and the most significant objects on images of documents are text inscriptions.

Besides, known analogues in the field of reformatting possess essential restrictions: there is a change of proportions of objects or there are restrictions on the size of resulting image.

In the known analogues, describing technical decisions on change of a format of digital images, technologies of framing and duplication of image elements are used, which are based on operations of addition/removal of group of pixels. The group of pixels represents a horizontal or vertical line from coherent pixels. However, it is desirable that removal or addition of groups of pixels can be made basically on borders of images and/or one or more objects located near the borders of the image are not distorted.

SUMMARY

The present general inventive concept provides development of a method and a system of reformatting without lacks, inherent to the above-mentioned analogues and prototype. The present general inventive concept also provides a method of optimum removal/addition of group of pixels. The group of pixels is understood as a coherent path which can shape various forms, and not just only horizontal or vertical. This path can be in any place of the image depending on a location of one or more objects, which provides preservation of their proportions and the sizes. The present general inventive concept also provides a new decision to consider an opportunity of reformatting images received by means of various devices and systems, such as copy devices, faxes, printers, cameras, Internet-browsers, etc. The present general inventive concept also provides a system and method to prevent changes of proportions and sizes of the objects, thereby considerably improving quality of reformatted images.

The present general inventive concept also provides development of improved method and system of reformatting of a digital image.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a method of adaptive reformatting of digital photos and document images, including selecting a rule of calculation of function of value for pixel depending on results of the analysis of the image, generating maps of values and history, changing a size of the image by adding/removing at least one found path using interpolation.

Both of horizontal and vertical paths may be used. The horizontal path may be a chain of the connected pixels where an initial pixel of the horizontal path is on the left border of the image, a final pixel of the horizontal path is on the right border of the image, and the quantity of pixels in the horizontal path is equal to the width of the image of pixels, whereas the vertical path may be a chain of the connected pixels where an initial pixel of the vertical path is on the top border of the image, a final pixel of the vertical path is on the bottom border of the image, and the quantity of pixels in the vertical path is equal to the height of the image of pixels. Search of a path may be executed by means of minimization of a sum of values of pixels of a path. The method may further include repeating generation of the maps of values and history and change of the size of the image until a desired size of the image is achieved or the sum of path values exceeds a predetermined threshold.

Detecting a face image of people may be used when a rule of calculation of function of value is selected.

A detector of city stages and architectural constructions may be used when a rule of calculation of function of value is selected.

A high-frequency filter may be used when the map of values is generated.

A function describing colors typical for the human skin may be used when the map of values is generated.

The changing a size of the image may increase the image by adding at least one path by defining a path with a minimum sum of values, adding new pixels next to pixels of the path using interpolation by several nearest pixels, weakening values in the map of history and updating the map of history, and updating values in the map of values.

The changing a size of the image may reduce the image by removing at least one path from the image by defining a path with a minimum sum of values, removing pixels of the path and correcting values of the pixels, thereby bordering with the pixels of the removed path, weakening values in the map of history and updating the map of history, and updating values in the map of values.

The weakening values in the map of history may use the following equation:

$$H(i,j)=H(i,j)^{-1}-C,$$

where $H(i,j)$ denotes a value of element of the map of history, $H(i,j)^{-i}$ denotes a value of element of the map of history before weakening, and C denotes a predetermined constant.

The foregoing and/or other aspects and utilities of the present general inventive concept may be also achieved by providing a system of adaptive reformatting of digital photos, including a module to select a rule of calculation of function of value for a pixel, a generator of maps of values and history, a module to analyze the map of values and select a path, a module to add a path to an image, a module to remove a path from an image, a scaling module, a module to weaken the map of history, and a module to update the map of values.

An output of the module to select a rule of calculation of function of values for a pixel is connected with an input of the generator of maps of values and history, and also with an input of the module to update the map of values, an output of the generator of maps of values and history is connected with an input of the module to analyze the map of values and select a path, an output of the module to analyze the map of values and select a path is connected with inputs of the module to add a path to the image, of the module to remove a path from the image, and of the scaling module, outputs of the module to add a path to the image and of the module to remove a path from the image are connected with an input of the module to weaken the map of history, an output of the module to weaken the map of history is connected with an input of the module to update the map of values, and an output of the module to update the map of values is connected with an input of the module to analyze the map of values and select a path.

The module to select a rule of calculation of function of value for a pixel selects a rule of calculation of function of value for each pixel from a set of predetermined rules depending on information contained in the image. The generator of maps of values and history generates an initial map of values and an initial map of history, using the selected rule. The module to analyze the map of values and select a path determines at least one horizontal path from connected pixels, where an initial pixel of a path is on the left border of the image, a final pixel of the path is on the right border of the image, and the quantity of pixels in the path is equal to the width of the image of pixels, and also determines at least one vertical path from connected pixels, where an initial pixel of a path is on the top border of the image, a final pixel of the path is on the bottom border of the image, and the quantity of pixels in a path is equal to the height of the image of pixels.

If a sum of pixel values of all found paths is greater than or equal to a predetermined threshold, the image is transferred to the scaling module, and if the sum is less than the predetermined value, the image and the maps of values and history are transferred to the module to add a path to the image or the module to remove a path from the image depending on a current and required ratio of the sides of the image. The module to add a path to the image increases the current image by adding the least one found path to the image using interpolation for several nearest pixels. The module to remove a path from the image reduces the current image by removing the least one found path from the image. The module to weaken the map of history reduces the values in the map of history, which correspond to environment of pixels of paths removed or added earlier. The module to update the map of value recalculates a map of values, using the previously selected rule and map of history.

The reformatting image differs from the initial image in its form, sizes and/or a format (the ratio of the geometrical sizes of the digital image), and the size and proportions of the most important objects on the image are maintained. In the claimed invention, the method and system of adaptive reformatting of digital images by removal and/or addition of the least important pixels of the image are offered.

The foregoing and/or other aspects and utilities of the present general inventive concept may be also achieved by providing an image forming apparatus, including a module to select a rule of calculation of function of value for a pixel from a set of predetermined rules depending on information contained in an image, a generator to generates an initial map of values and an initial map of history, using the selected rule, a module to search at least one horizontal or vertical path with a minimum sum of values by analyzing the initial map of values, and a module to change a size of the image by adding or removing a path to or from the image using the searched path.

The horizontal path may be a chain of pixels where an initial pixel is on the left border of the image, a final pixel is on the right border of the image, and the quantity of pixels is equal to the width of the image of pixels, and the vertical path may be a chain of pixels where an initial pixel is on the top border of the image, a final pixel is on the bottom border of the image, and the quantity of pixels is equal to the height of the image of pixels.

The image forming apparatus may further include a module to scale the image if a sum of pixel values of the paths is greater than or equal to a predetermined threshold.

The module to change a size of the image may include a module to add the searched path to the image, and a module to remove the searched path from the image.

The module to add the searched path may add at least one path by adding new pixels next to pixels of the searched path using interpolation by several nearest pixels, by weakening values in the map of history and updating the map of history, and updating values in the map of values.

The module to remove the searched path may remove at least one path by defining a path with a minimum sum of values, removing pixels of the path and correcting values of the pixels, thereby bordering with the pixels of the removed path, weakening values in the map of history and updating the map of history, and updating values in the map of value.

The module to select a rule of calculation of function of value may use detecting a face image of people.

The module to select a rule of calculation of function of value may use detecting city stages and architectural constructions.

The generator may use a high frequency filter.

The generator may use a function describing colors typical for human skin.

In order to preserve coherence and form of the digital image, at least one group of the least important coherent pixels in a vertical or horizontal direction is calculated on each operation of reformatting. The coherent group of pixels will be called "path" hereinafter in the text. On each operation of reformatting, the calculated path is removed or added to a new image with the changed geometrical sizes. Subsequently, the received image is used as an initial image on the subsequent operations of reformatting. This process is repeated until the image has necessary sizes/formats.

A special function of value is used to calculate degree of importance of each pixel of the image. It is necessary to note that this function considerably depends on the content and on the nature of image (photo, document image, facsimile image, etc.). This function can be selected from a predetermined set of possible functions by a method including defining content of the image and corresponding function of value, which describes in the best way importance of pixels for the given class of images, by a user, selecting a function of value interactively, and by the system and the device which use the method of reformatting according to the formula of the present invention, defining and adjusting the function of value.

For the current image, the map of values is calculated after selection of the function of value has been executed. The map of values represents an array with a dimension equivalent to a dimension of a processable image. Each element of the map of values sets a numerical value of degree of importance of the corresponding pixel of the image. In order to find an optimum coherent path which contains the least important pixels, a weighed graph with directivity is constructed. Due to the graph, the optimizing problem of search of a path with a minimum sum of values is solved. Graph junctions correspond to pixels of the image, and weight coefficients are assigned to graph edges by means of the map of values. This search is made in vertical and horizontal directions for calculation of horizontal and vertical paths accordingly. The decision of set optimization problem is made by means of algorithms and methods of dynamic programming and is described in more detail below. The paths, received thus, are removed or added to the image for change of the size/format of the image.

The method of reformatting described above can be used to reduce one or several sides of the image by simply excluding the found path of the image. However, there are certain restrictions for operation of increase of the image. It is obvious that after a finding and addition of an optimum path on the image there is the great chance of a finding and duplication of the same path of the subsequent iterations of reformatting. This results in effect of extension of the image and duplication of the same path on all iterations of reformatting. The map of history is used to prevent such situation and to remove restrictions on the size of the received image during increase of the images. Each element of the map of history represents an additional degree of importance for each pixel of the image. The degree of importance does not depend from the image and depends on the added/removed paths on the previous iterations.

The map of history is initialized in the beginning of reformatting. In particular, a minimum value is set to all elements of the map of history during operation of increase. On each iteration of reformatting, the size of the map of history and the processable image are equal to each other. During operation of increase, the found path is added to both of the processable image and the map of history. The maximum value is set to elements of the map of history, which belong to the found method and its added copy. Such setting allows avoiding undesirable duplication of the same paths during increase, as the added path will have the large sum of values on following iteration and will not be selected.

During reformatting, the map of history can be considerably filled with elements with the maximum values, and a process of searching an optimum path seems to be impossible. In order to prevent such situation, a procedure of weakening the map of history is performed, which reduces values of elements of the map of history by time. Thus, oversaturation of the map of history by elements with the maximum values is not supposed.

A card of history is also used to accumulate paths which are needed to be excluded from the image in operation of reduction. Such approach seems to be much more effective than approach of removal of paths on each iteration. In addition, using of the map of history is not limited to operations of increase and reduction of images. It can be used for removal or saving of the objects, chosen by the user, by assigning small or great values to corresponding elements of the map of history.

A method of adaptive reformatting of digital photos and document images includes initializing the map of history, selecting a function of value, calculating the map of value, weakening the map of history, searching an optimum path, updating (operation of removal/addition of the path) the processable image using at least one calculated path, updating the map of history using the calculated path/paths, and repeating the above-described operations until a necessary size/format of the image is received.

The foregoing and/or other aspects and utilities of the present general inventive concept may be also achieved by providing a method of an image forming apparatus, the method including selecting a rule of calculation of function of value for a pixel from a set of predetermined rules depending on information contained in an image, generating an initial map of values and an initial map of history, using the selected rule, searching at least one horizontal or vertical path with a minimum sum of values by analyzing an initial map of values, and changing a size of the image by adding or removing the path to or from the image using the searched path.

The foregoing and/or other aspects and utilities of the present general inventive concept may be also achieved by providing a computer readable medium to contain computer-readable codes as a program to perform a method of reformatting an image in an image processing apparatus, the method including selecting a rule of calculation of function of value for a pixel from a set of predetermined rules depending on information contained in an image, generating an initial map of values and an initial map of history, using the selected rule, searching at least one horizontal or vertical path with a minimum sum of values by analyzing an initial map of values, and changing a size of the image by adding or removing the path to or from the image using the searched path.

The foregoing and/or other aspects and utilities of the present general inventive concept may be also achieved by providing a system to adjust an image, including a first module to receive a signal representing an image having a plurality of pixels disposed on a plurality of paths and to select one of the paths according to a relative characteristic of the paths, and a second module to add or deleted the selected path to generate a signal representing a second image different from the image.

The second module may adjust values of pixels disposed adjacent to the pixels of the added or deleted path.

The system may further include a unit configured to receive at least one of the signal and the second signal to be displayed or printed.

BRIEF DESCRIPTION OF THE DRAWINGS

These and/or other aspects and utilities of the present general inventive concept will become more apparent and more readily appreciated from the following description of the embodiments, taken in conjunction with the accompanying drawings of which:

FIGS. 16 to 19 are views illustrating examples of reformatted images of documents;

FIG. 18 is a view illustrating examples of reformatting of HTML document; and

FIGS. 20 to 23 are views illustrating examples of using a system for reformatting a photo to transform an initial format of 4:3 to a format of 3:2.

DETAILED DESCRIPTION OF THE EMBODIMENTS

Figure 1:
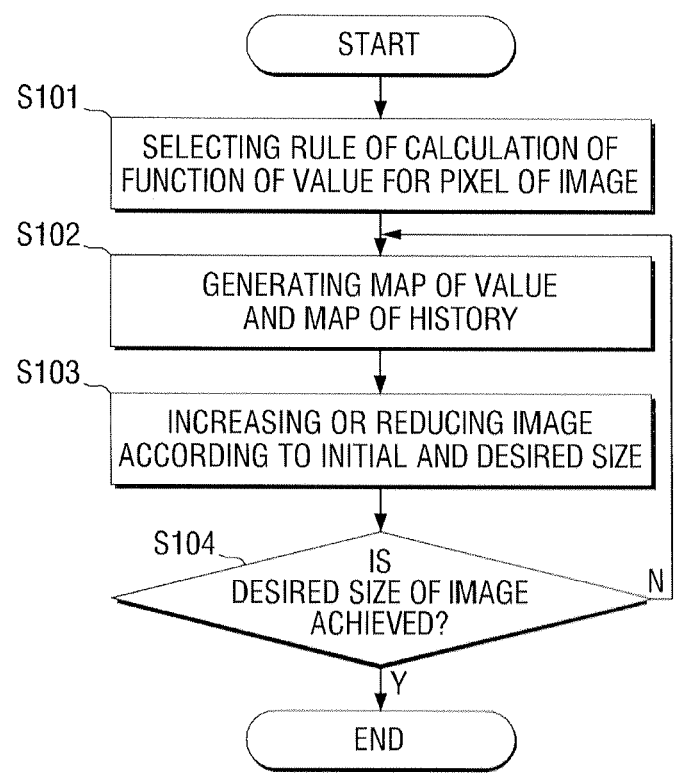
FIG. 1 is a flowchart illustrating a method of adaptive reformatting of digital photos and document images according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

The present general inventive concept will be described in detail using graphic materials.

The present general inventive concept relates to a system and/or a method to change a size of an image by adding or removing pixels which have low importance (self-descriptiveness) in the image. The importance of each pixel is determined by a function of values. The kind of this function depends on information contained in the image and determines result of reformatting.

FIG. 1 is a flowchart illustrating a method of adaptive reformatting of an image, such as a digital photo and a document image, according to an exemplary embodiment of the present general inventive concept. In operation S101, a rule of calculation of a function of values for pixels is determined according to a result of analyzing the image. The rule of calculation of a function of values is selected from a predetermined set of rules automatically or interactively.

The value of a pixel may be a value representing a level of a characteristic of the pixel, such as brightness, chrominance, color component, etc. The value may be a relative characteristic with respect to a reference or a relative position of the image. The image may include one or more pixels disposed on a path. The path may be a horizontal or vertical path on which a plurality of pixels are disposed. It is possible that the path may be a path having an angle with the horizontal or vertical path. It is also possible that the path may be linear or non-linear depending on a characteristic of the image. It is also possible that the path may be a path including a combination of at least two of the horizontal path, the vertical path, and the path having an angle with at least one of the horizontal path and the vertical path.

When the rule of calculation is selected manually or interactively, a controller of a system (i.e., image processing apparatus) generates a signal representing an interface to perform the method of adaptively reformatting an image according to the present general inventive concept. The generated interface is displayed on a screen of a display unit connectable to the image processing apparatus or installed on a housing body of the image processing apparatus. The generated interface may include one or more rules of calculation, and a user can select one of the displayed rules of calculation using an input unit connectable to the image processing apparatus or installed on the image processing apparatus. When the screen is a touch screen, the user may select the rule of calculation by contacting a corresponding portion of the screen. The interface may include at least one of the predetermined rules of calculation, the image, and instruction to guide a user to select the rule.

In operation S102, maps of values and history are generated according to the selected rule of calculation. In operation S103, the image is increased or reduced depending on an initial size of the image and a demanded size of another image adjusted from the image. The increase or reduction of the image is performed by means for adding at least one found horizontal or vertical path to the image using interpolation, or by means for removing at least one found horizontal or vertical path from the image. The horizontal pixel is a chain of pixels, which are disposed on a path. When the path is a horizontal path, an initial pixel of the horizontal path is on the left border of the image, a final pixel of the horizontal path is on the right border of the image, and the quantity of pixels in the horizontal path is equal to a width of the image of pixels. The vertical path is a chain of pixels, which are disposed on a path. When the path is a vertical path, an initial pixel of the vertical path is on the top border of the image, a final pixel of the vertical path is on the bottom border of the image, and the quantity of pixels in the vertical path is equal to a height of the image of pixels.

Here, the chain of pixels may be a chain of connected pixels which are continuously disposed along the path. However, it is possible that the chain of connected pixels may be not continuously disposed. It is also possible that the quantity of the pixels in the horizontal or vertical path may not be equal to the width or height of the image but different from the width or height of the image.

Search for the path is based on minimization of a sum of values of pixels of the corresponding path. If a desired size of the image is reached in operation S104, the method finishes the operation. Otherwise, maps of values and histories are generated according to the sum in operation S102, and also, the operation S103 of increasing or reducing the image is repeated until the demanded size of the image will be reached or the sum of values of the path will exceed a predetermined threshold.

As a whole, a function of values (F) is defined by the following equation:

$$F(I,x,y)=\text{grad}(I,x,y)+\text{POI}(I,x,y),\qquad [\text{Equation 1}]$$

wherein I denotes a processable image, x,y denote coordinates of pixels, grad(I,x,y) denotes a function of calculation of gradient for pixels with coordinates (x,y), and POI denotes a function of detection of a specific pixel.

The function grad(I,x,y) sets general importance of each pixel in high-frequency borders of the image. Linear and nonlinear high-frequency filters, such as Sobel's operator, a module of the gradient of colors, horizontal and vertical final differences, Laplacian-gaussian can be used as a given function. However, not only pixels on high-frequency borders are important on the digital image. The function POI adds a value uniformly, except for significant areas, such as a skin of the human, fragments of architectural constructions and so on.

Figure 2:
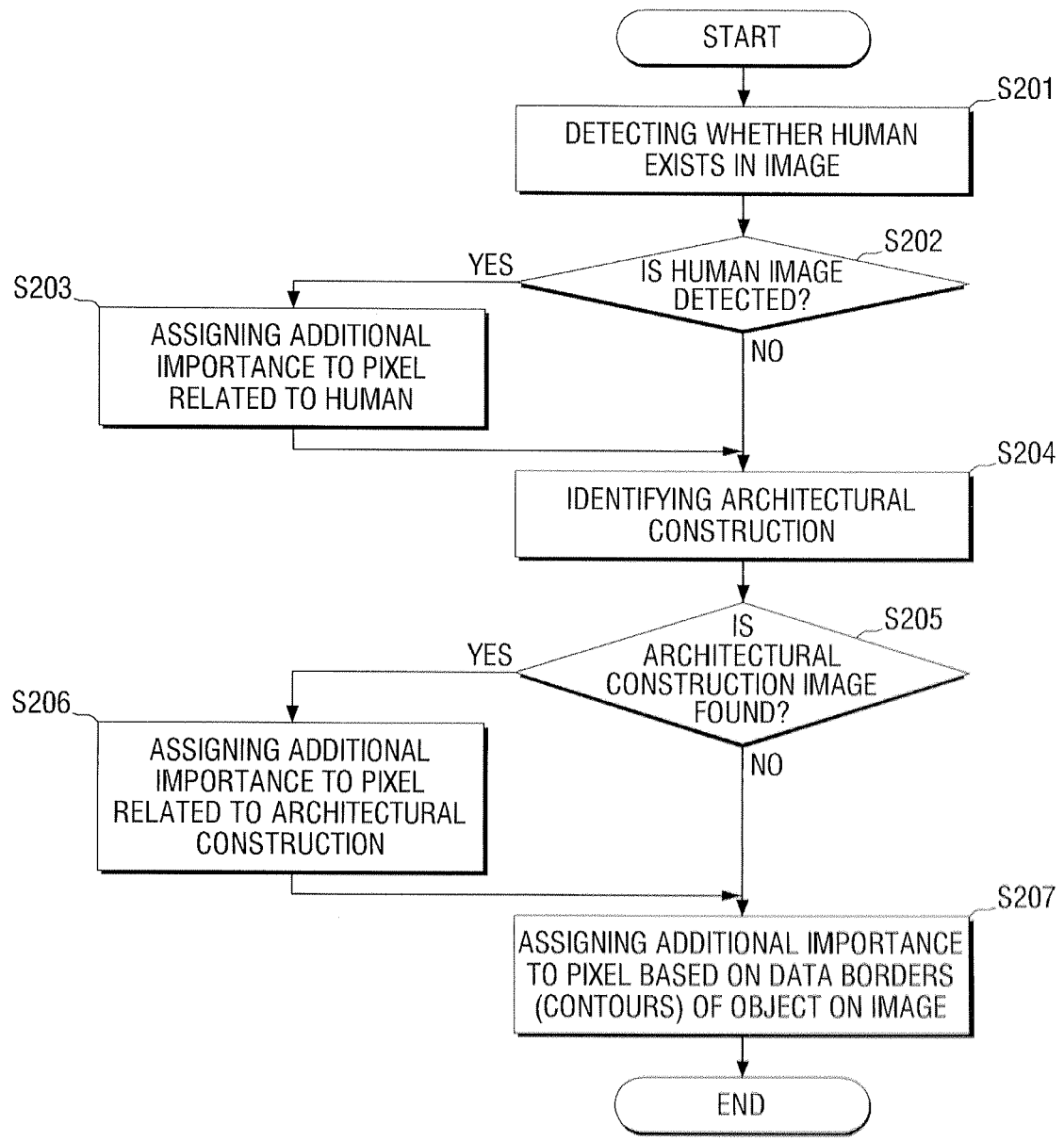
FIG. 2 is a flowchart illustrating a process of analyzing the image in selecting a rule of calculation of function of value for a pixel.

FIG. 2 is a flowchart illustrating a process of analyzing an image in selecting a rule of calculation of a function of values for pixels. In operation S201, detecting presence of the human on the image is performed. In the present general inventive concept, the detecting is realized using a function describing colors as a characteristic such as a human skin. The function may be one or function described, for example, in article G. Gomez, E. Morales, Automatic feature construction and a simple rule induction algorithm for skin detection, proc. of the ICML Workshop on Machine Learning in Computer Vision, pp. 31-38, 2002. If the pixels representing colors having a characteristic such as a human skin occupy a significant area, yes in operation S202, it is considered that there is a human on the image, and, in operation S203, a rule of calculation of function of values for pixels is selected such that larger values are assigned to pixels, which presumably concern to the image of the human. After identifying the architectural construction in operation S204, a detector of city stages and architectural constructions is used in operation S205. The detector may be one of detectors, for example, described in article N. Serrano, A. Savakis, J. Luo, A computationally efficient approach to indoor/outdoor scene classification, Proc. International Conference on Pattern Recognition, 2002, 146-149; in the patent application of the Russian Federation 2006136861 and in report A. Vailaya, A. Jain, J. Z. Hong, On image classification: city vs. landscape, Proc. IEEE Workshop on Content-Based Access of Image and Video Libraries, pp. 3-8, 1998. If there are architectural constructions on the image in operation S203, a rule of calculation of function of values for pixel is selected in operation S206 such that larger values are assigned to pixels, which correspond to lengthy direct lines. In operation S207, a high-frequency filter is selected to calculate of value of each pixel. The detectors may not depend from each other and can be used in any sequence.

Figure 3:
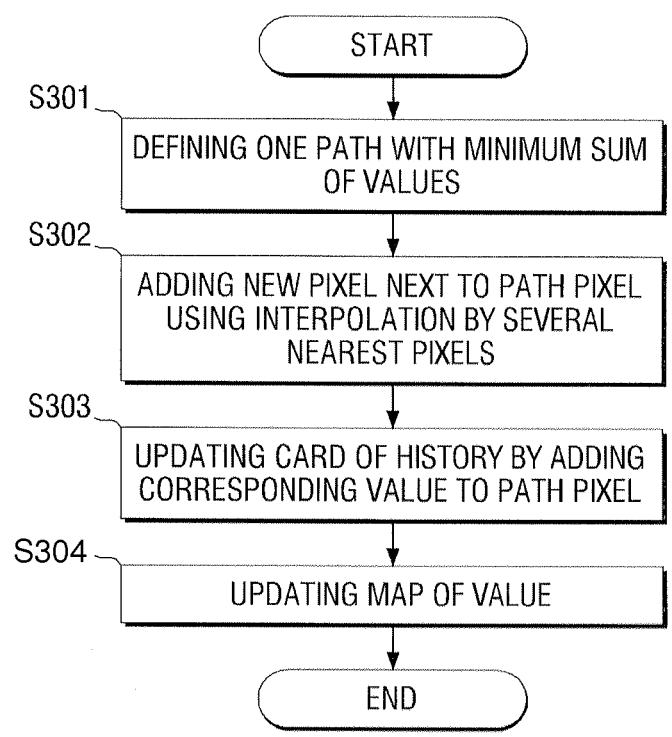
FIG. 3 is a flowchart illustrating a process of increasing the image by adding a path.

FIG. 3 is a flowchart illustrating a process of increasing an image by adding a path. In operation S301, at least one path with the minimum sum of values is defined. It is possible to simultaneously process a plurality of paths in parallel in a single process. In operation S302, a new pixel is added next to pixels of the path using interpolation by a plurality of nearest pixels. In operation S303, a card of history is updated by adding a value corresponding to the path pixel and weakening values of pixels which were given earlier in the original (initial image). In operation S304, values are updated in the map of values by applying the image of the function of calculation of values and the map of history to pixels.

Here, "weakening" represents "adjusting," "corrected" or "reducing" the value of the respective pixels. The respective pixels may be pixels disposed adjacent to the path which has been added to or deleted from the image. Therefore, when the pixel values are weakened, the value of pixels are adjusted, reduced, or increased to compensate for at least one defect occurring due to the added or deleted pixels of the path in the adjusted image.

The card of history may be data representing at least one of the image, the adjusted image, and changes of the path, pixels of the path, and values of the pixels. The data may be stored in a memory unit connectable to the image processing apparatus or mounted in the image processing apparatus.

Figure 4:
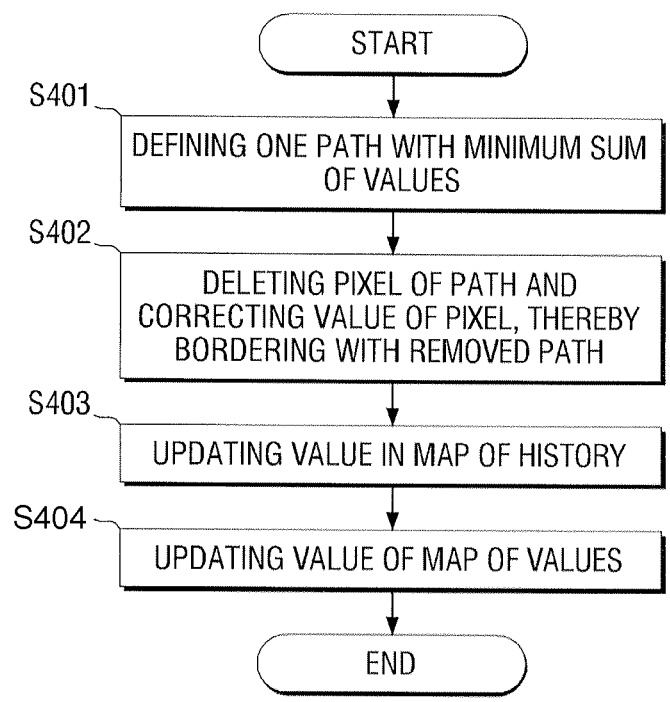
FIG. 4 is a flowchart illustrating a process of reducing the image by removing a path.

FIG. 4 is a flowchart illustrating a process of reducing an image by removing a path. In operation S401, at least one path having a minimum sum of values is defined. It is possible to simultaneously process a plurality of paths in parallel for one iteration. In operation S402, pixels of the path are deleted and values of pixels are corrected such that the image is bordered with pixels of the removed path. In operation S403, the map of history is updated by deleting elements corresponding to pixels of the path from the map, adding values, corresponding to pixels, next to pixels of the path, to it and weakening values which were in the given map earlier. In operation S404, values in the map of values are updated by applying the image of function of calculation of values and the map of history to pixels.

Figure 5:
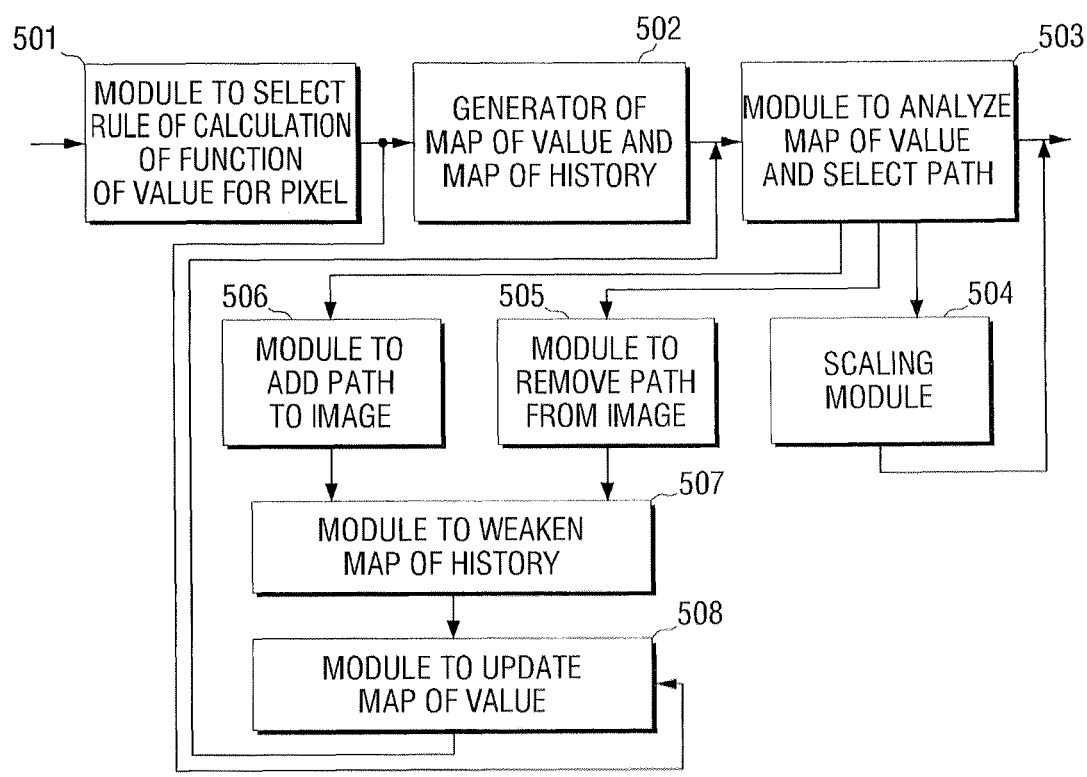
FIG. 5 is a block diagram illustrating a system according to an exemplary embodiment of the present general inventive concept.

FIG. 5 is a block diagram illustrating a system of adaptive reformatting of an image, such as a digital photo and a document image. The system may be an image processing apparatus. The system includes a module 501 to select the rule of calculation of function of value for pixel according to a signal received from an external device connectable to the system or an internal device mounted in the system, a generator 502 to generate or store maps of values and history, a module 503 to analyze the map of values and select a path, a scaling module 504, a module 505 to remove a path from the image, a module 506 to add a path to the image, a module 507 to weaken the map of history, and a module 508 to update the map of values. The module may represent a unit configured to perform its own operation.

The output of the module 501 to select the rule of calculation of function of value for pixel is connected with an input of the generator 502 of maps of values and history, and also with an input of the module 508 to update the map of values. The output of the generator 502 of maps of values and history is connected with an input of the module 503 to analyze the map of values and select a path. The output of the module 503 to analyze the map of values and select a path is connected with inputs of the module 506 to add a path to the image, the module 505 to remove a path from the image and the scaling module 504. The output of the module 506 to add a path to the image and the module 505 to remove a path from the image is connected with an input of the module 507 to weaken the map of history. The output of the module 507 to weaken the map of history is connected with an input of the module 508 to update the map of values. The output of the module 508 to update the map of values is connected with an input of the module 503 to analyze the map of values and select a path.

The module 501 to select the rule of calculation of function of value for pixel selects the rule of calculation of function of value for each pixel of the image from a predetermined set, depending on information contained in the image. The generator 502 of maps of values and history generates initial maps of values and history, using the selected rule. The module 503 to analyze the map of values and select a path defines at least one horizontal path from the pixels where the initial pixel of the path is on the left border of the image, the final pixel of the path is on the right border of the image, and the quantity of pixels in path is equal to width of the image of pixels, and also defines at least one vertical path from the pixels where the initial pixel of the path is on the top border of the image, the final pixel of the path is on the bottom border of the image, and the quantity of pixels in path is equal to height of the image in pixels. If a sum of values of pixels of all found paths is greater than or equal to a predetermined threshold, the image is transferred to the scaling module 504, and if the sum of values of pixels of all found paths is less than the predetermined threshold, this module transfers the image to the module 506 to add a path to the image or to the module 505 to remove a path from the image, depending on a current and demanded ratio of the sides of the image.

The module 506 to add a path to the image increase the current image by adding the at least one found path to the image using interpolation by several nearest pixels. The module 505 to remove a path from the image reduces the current image by removing at least one found path from the image. The module 507 to weaken the map of history reduces values in the map of history, which correspond to vicinities of pixels of paths removed or added earlier. The module 508 to update the map of values recalculates the map of value, using earlier selected rule and the map of history.

Although the operations of the system have been described above, the present general inventive concept is not limited thereto. The method may further include one or more operations of calculating an optimum path and the map of history and processing change of the size/format of the image are described below in details.

Figure 6:
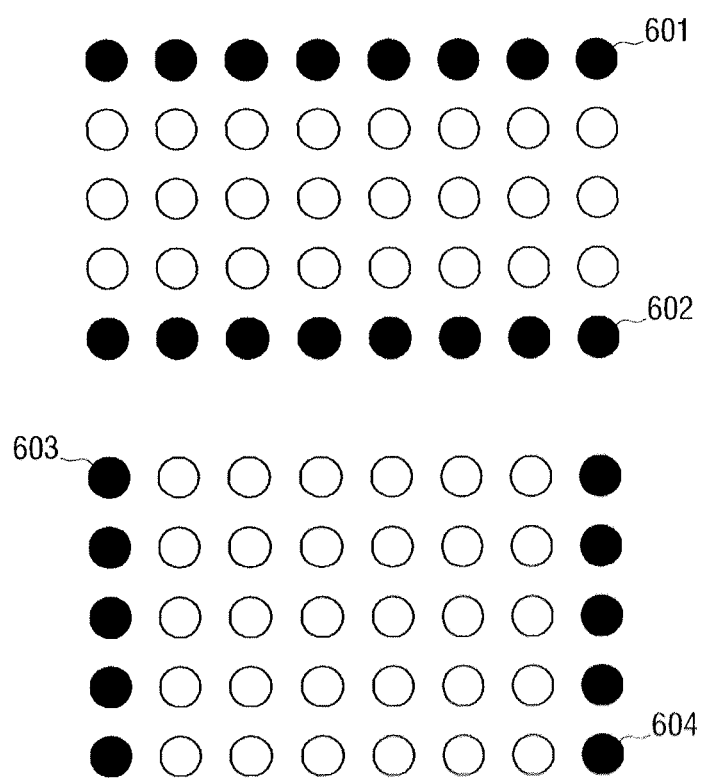
FIG. 6 is a schematic view illustrating borders of the image used to search for an optimum path.

The operation of calculating an optimum path is to search a connected path of pixels in a vertical or horizontal direction between opposite borders of the image. FIG. 6 illustrates a top border 601 and a bottom border 602 of the image, and also illustrates a left border 603 and a right border 604. Search for a vertical path is performed between the top border 601 and the bottom border 602, and search for a horizontal path is performed between the left border 603 and the right border 604.

Figure 7:
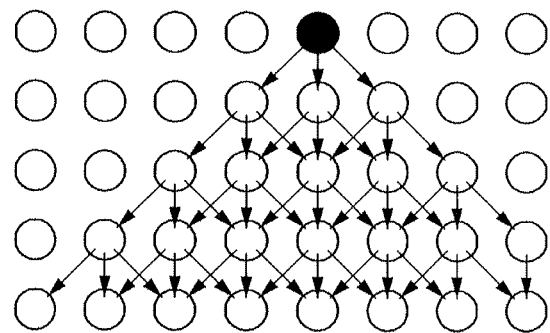
FIG. 7 is a schematic view illustrating a model of a graph for decision of optimization problem of search of the optimum path.

For each pixel belonging to the top border 601 or the left border 603, a weighed graph with a directivity is constructed as illustrated in FIG. 7. Each pixel of the image is associated with a corresponding graph junction. Each graph junction has three edges with set weight factors. The quantity of edges is not limited rigidly. The present invention is applicable to a graph with 5 or more edges starting from each graph junction. However, if a graph with edges more than 3 is used, computation complexity of algorithm of search of an optimum path increases, and connectivity of objects on the image decreases, which results in reduction of quality of received results.

Figure 8:
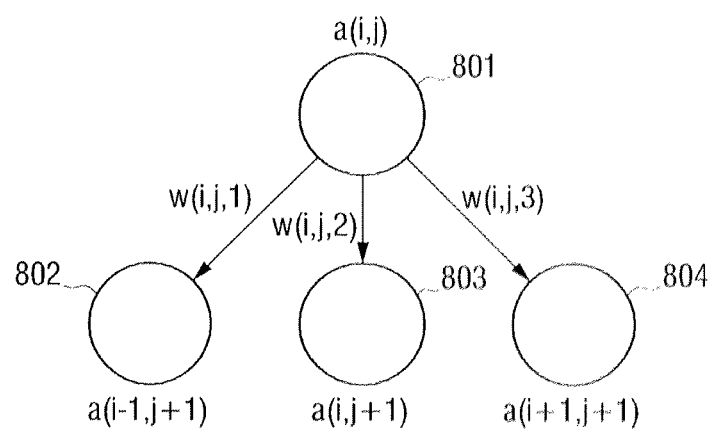
FIG. 8 is a schematic view illustrating assigning weights to graph edges.

An weight coefficient w (i,j,k) is assigned to each edge, wherein the coefficient is equal to corresponding value of the map of values plus corresponding value of an element of the map of history according to assigning weights illustrated in FIG. 8. The weight coefficient is assigned to each edge, which is starting from a current graph junction, under following equation:

$$w(i,j,1)=a(i-1,j+1)+h(i-1,j+1)$$

$$w(i,j,2)=a(i,j+1)+h(i,j+1)$$

$$w(i,j,3)=a(i+1,j+1)+h(i+1,j+1)'$$

where i,j denote corresponding coordinates of graph junction, k denotes the number of edges, a( ) denotes an element corresponding to map of values, and h( ) denotes an element corresponding to the map of history.

In addition to the above-describe method of adjusting an image by adding or deleting the selected pixels of a selected path, in an operation of searching for an optimum path between borders of images on the set graph, the optimality is defined as search for the connected path with a minimum sum of values along this path. The sum $l(\mu)$ of values of the path $\mu$ consisting of sequence of edges $a_1, a_2 \ldots a_n$, is equal to the sum of weight coefficients along $\mu$ and is defined by the following equation:

$$l(\mu) = \sum_{i=1}^{n} w(i) \qquad \text{[Equation 3]}$$

The optimum path can be effectively searched by algorithms of search on the graph and methods of dynamic programming The algorithms may be well known. Therefore, detailed descriptions thereof will be omitted.

Figure 9:
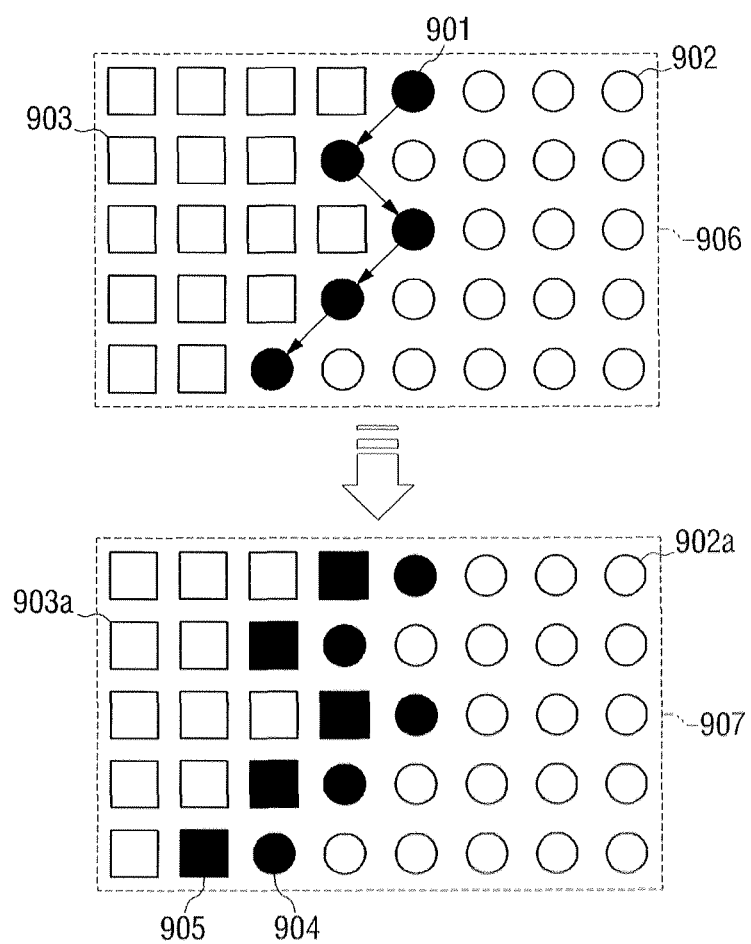
FIG. 9 is a schematic view illustrating reducing the image during reformatting.

As illustrated in FIG. 9, found optimum path 901 divides a processable image 906 into two parts 902 with pixels indicated by white circles and 903 with pixels indicated by white rectangles. A reduced image 907 includes two parts 902a and 903a by deleting pixels of the path 901. Groups of pixels 905 and 904, which include the pixels locating in immediate proximity from the pixels belonging to the found optimum path 901, can be processed in addition by means of procedure of interpolation for smoothing and compensation of the possible defects, during an operation of deleting the path 901 from the image.

Figure 10:
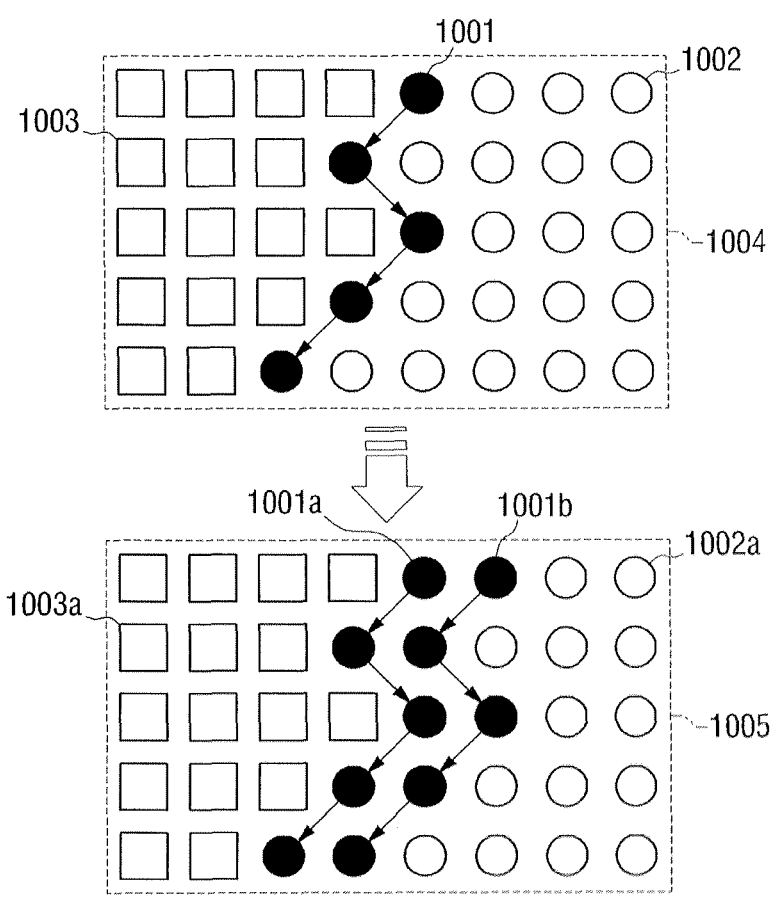
FIG. 10 is a schematic view illustrating increasing the image during reformatting.

The similar method is used in operation of increase (see FIG. 10). A found optimum path 1001 divides a processable image 1004 into two parts 1002 and 1003. An increased image 1005 consists of two parts 1002a and 1003a which are equivalent to the corresponding parts 1002 and 1003 of the image. The found optimum path 1001 forms or is replaced with copies 1001a and 1001b by adding pixels duplicated along the found path to the image 1005. With respect to pixels belonging to the copies 1001a and 1001b of the optimum path, an additional interpolation procedure is performed.

Figure 11:
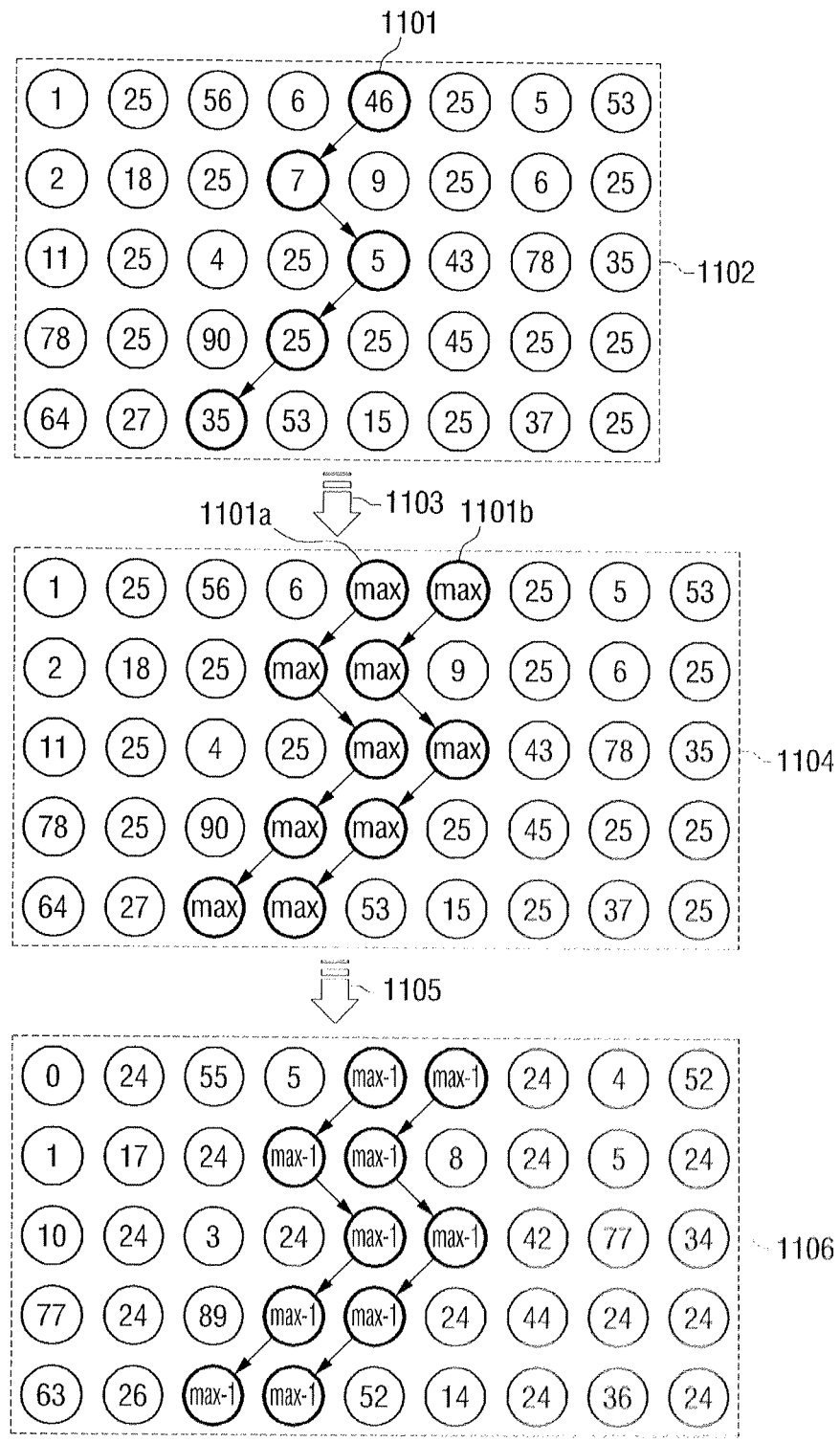
FIG. 11 is a schematic view updating and weakening a map of history.

The map of history is also updated when increasing the image is repeated and is also updated according to the found optimum path. FIG. 11 illustrates examples of updating 1103 and weakening (adjusting, correcting, reducing, or increasing) 1105 of the map of history. The map of history 1102 and the found optimum path 1101 are used to receive the increased map of history 1104. The maximum values are assigned to elements of the map of history, which belong to the found optimum path 1101*a* and its duplicated copy 1101*b*. The weakened map of history 1106 represents the increased map of history 1104 of which elements corresponding to values (changes) of corresponding pixels are reduced (adjusted, corrected, or increased) by a predetermined value. The following function is used in this example $$H(i,j) = H(i,j)^{-1} - C \qquad \text{[Equation 4]}$$

where H(i,j) denotes a value of element of weakened map of history, $H(i,j)^{-i}$ denotes a value of element of map of history before the procedure of weakening, and C denotes a predetermined constant value. Use of other functions of weakening is also possible and the present general inventive concept is not limited to the functioning of weakening, resulted above.

Figure 12:
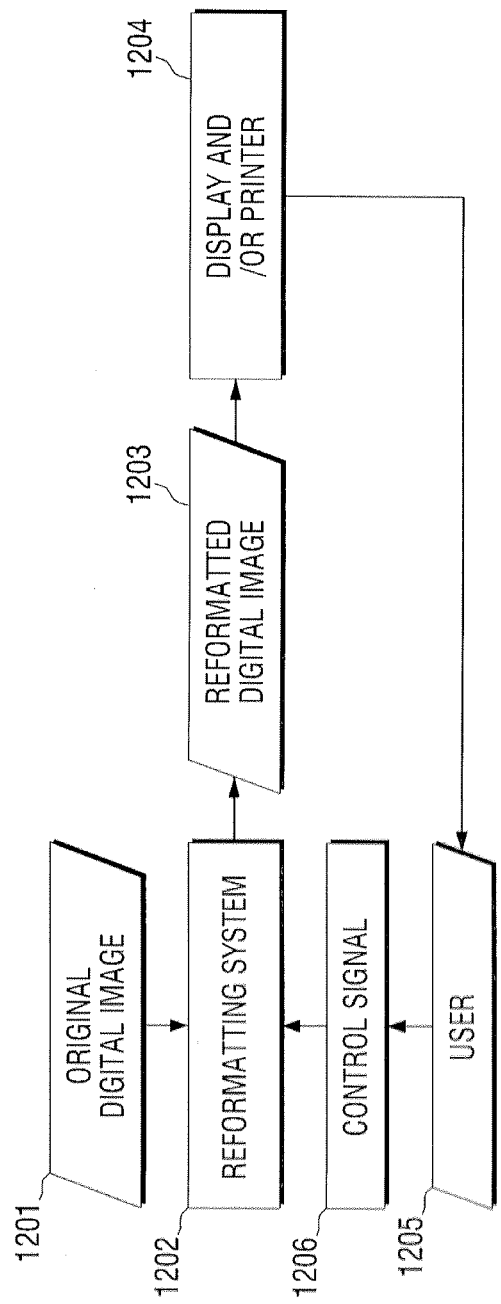
FIG. 12 is a block diagram illustrating an interactive system for reformatting.

The system of adaptive reformatting of digital images according to the exemplary embodiment of the present invention can operate completely in an automatic mode, when a demanded size/format of resulting image is known. According to the present general inventive concept, the system may be an interactive system of reformatting in the case where a final size/format of the image is unknown. As illustrated in FIG. 12, an initial digital image 1201 is reformatted to an image 1203 with a new size/format by the adaptive system of reformatting 1202. The size/format of the resulting image is controlled by a user 1205 in an interactive mode by generating one or more user signals 1206, which enter on an input of system of reformatting. Intermediate/final results of reformatting 1203 is displayed on a display device 1204 and perceived by the user 1205. The user 1205 decides based on the intermediate result displayed on the display device 1204, and generates new control signals to receive a desirable resulting image.

Figure 13:
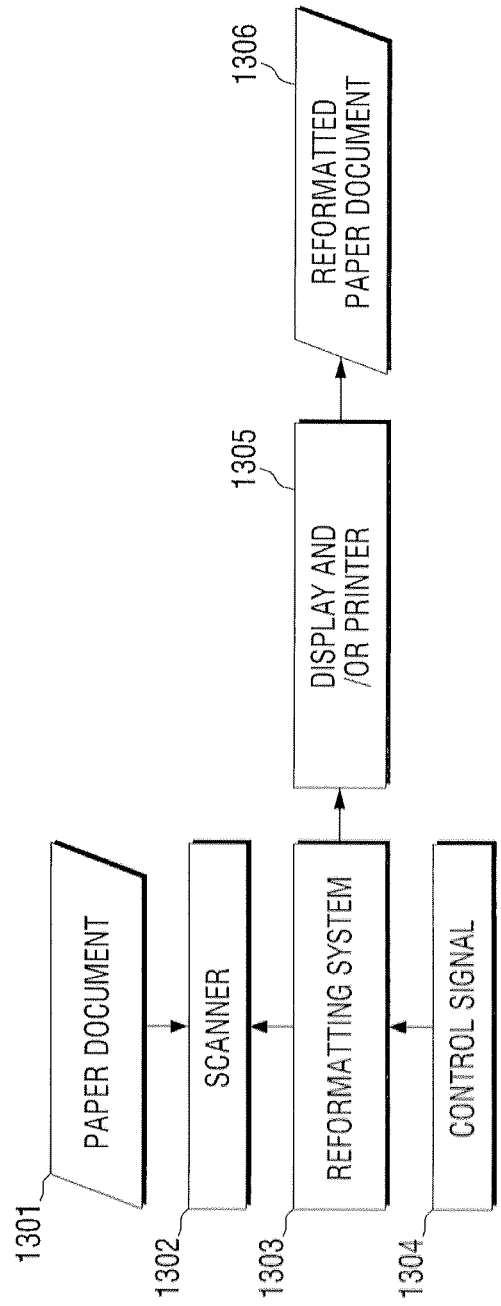
FIG. 13 is a block diagram illustrating a reformatting system for copiers.

The system may be an image forming apparatus, such as a copier (see FIG. 13). A paper document 1301 is scanned by a scanning device 1302. Received digital representation of the paper document is reformatted by a system of reformatting 1303, according to incoming operating signals 1304 coming from a user and/or a copier. A reformatted digital image is printed on a printing medium and/or displayed on a corresponding display device 1305. Thus, a paper reformatted document 1306 is the result.

The image forming apparatus may be facsimile devices to reformat one or more facsimile documents.

Figure 14:
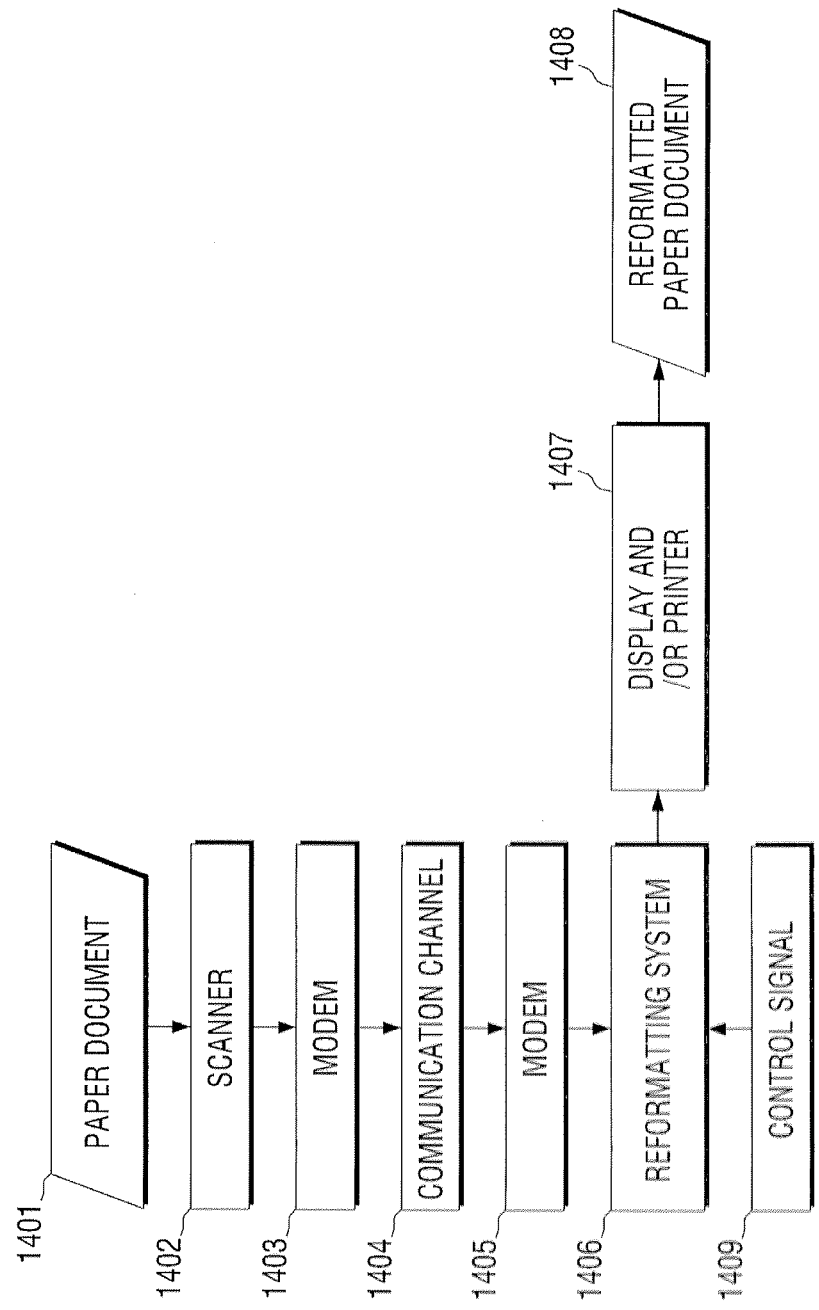
FIG. 14 is a block diagram illustrating a reformatting system for facsimile devices.

As illustrated in FIG. 14, the facsimile device may include a scanner 1402 to scan a document 1401 or a picture to generate a signal representing an image of the scanned document, a modem 1403 to transmit the signal through a communication channel 1404 which is a wired or wireless communication line, a modem 1405 to receive the signal through the communication channel 1404, a controller (reformatting system) 1406 to reformat the image according to the present general inventive concept and selectively according to a selection of a control signal of a control signal unit 1409, a functional unit to display the image 1407, the reformatted image or data representing the image and the reformatted image, and to perform an image forming operation to form the image or reformatted image on a printing medium as a reformatted paper document 1408.

Figure 15:
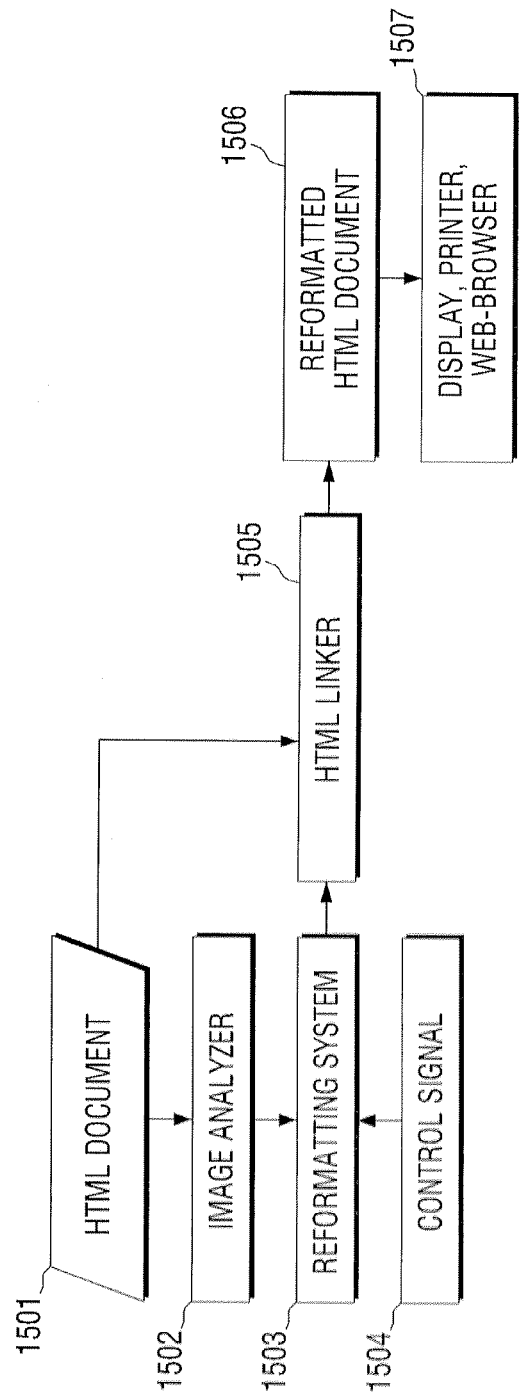
FIG. 15 is a block diagram illustrating a reformatting system for HTML documents.

The system may be a system of reformatting of HTML documents is illustrated in FIG. 15. The HTML documents is a document having a size of the HTML document which is set by a developer of the system. A <<scroll bars>> can be appeared at a display of the HTML document in the display space with sizes smaller than that the HTML developer of document has provided. It is possible that a set of images is presented on the HTML document, of which size is difficult to reduce and increase without causing defects of display. Therefore, there is a problem of display of HTML pages on devices (pocket computer, mobile phones, media players, etc.) with displays with a low level of resolution of the screen. Other problem may be a difficulty in printing of HTML documents on the printer.

Use of a system (FIG. 15) of reformatting of HTML documents to correctly display the HTML documents is provided. An initial HTML document 1501 enters on an input of a module 4504 to analyze image 1502, which analyzes images/flash animation contained in the HTML document. The received images is reformatted by the system of reformatting 1503 for change of the size/format of images according to control signals 1504. An HTML linker 1505 creates a new HTML document with reformatted images. The reformatted document 1506 is displayed on a corresponding display device 1507.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

FIGS. 16-23 are views illustrating an image and an adjusted or reformatted image according to the present general inventive concept. As illustrated in FIGS. 16-23, the adjusted or reformatted images are improved or compensated by adding or deleting pixels of a path and/or by adjusting (correcting or reducing or increasing) value of the corresponding pixels disposed adjacent to the added or deleted pixels of the path.

As described above, upon receiving an image having a plurality of pixels, a path is determined according to a characteristic of the image, the image is changed or adjusted by adding or deleting pixels disposed on a path, pixels disposed adjacent to the deleted or added path are adjusted (or weakened), information on the adjusted image is updated, without changing a size, a proportion and a relative position of an object included in the image.

Although exemplary embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A method of adaptive reformatting of digital photos and document images, the method comprising:
   selecting a rule of calculation of function of value for a pixel depending on results of analyzing an image;
   generating a map of value and a map of history;
   changing a size of the image by adding/removing at least one found path by means of interpolation, wherein both of horizontal and vertical paths are used, and the horizontal path is a chain of the connected pixels where an initial pixel of the horizontal path is on the left border of the image, a final pixel of the horizontal path is on the right border of the image, and the quantity of pixels in the horizontal path is equal to the width of the image of pixels, whereas the vertical path is a chain of the connected pixels where an initial pixel of the vertical path is on the top border of the image, a final pixel of the vertical path is on the bottom border of the image, and the quantity of pixels in the vertical path is equal to the height of the image of pixels, and search for the path is executed by means of minimization of a sum of pixel values of the path; and repeating generation of the maps of values and history and change of a size of the image until a demanded size of the image is achieved or the sum of path values exceeds a predetermined threshold.

2. The method of claim 1, wherein detecting a face image of people is used when the rule of calculation of function of value is selected.

3. The method of claim 1, wherein a detector of city stages and architectural constructions is used when the rule of calculation of function of value is selected.

4. The method of claim 1, wherein a high-frequency filter is used when the map of value is generated.

5. The method of claim 1, wherein a function describing colors typical for human skin is used when the map of value is generated.

6. The method of claim 1, wherein the changing a size of the image increases the image by adding at least one path to the image, comprising:
defining a path with a minimum sum of values;
adding new pixels next to pixels of the path using interpolation by several nearest pixels;
weakening values in the map of history and updating the map of history; and
updating values in the map of values.

7. The method of claim 1, wherein the changing a size of the image reduces the image by removing at least one path from the image, comprising:
defining a path with a minimum sum of values;
removing pixels of the path and correcting values of the pixels, thereby bordering with the pixels of the removed path;
weakening values in the map of history and updating the map of history; and
updating values in the map of value.

8. The method of claim 1, wherein the weakening values in the map of history uses the following equation:

$$H(i,j)=H(i,j)^{-1}-C$$

where $H(i,j)$ denotes a value of element of the map of history, $H(i,j)^{-1}$ denotes a value of element of the map of history before weakening, and $C$ denotes a predetermined constant value.

9. An image forming apparatus performing the method claimed in claim 1.

10. An image forming apparatus comprising:
a module to select a rule of calculation of function of value for a pixel from a set of predetermined rules depending on information contained in an image;
a generator to generate an initial map of values and an initial map of history, using the selected rule;
a module to search at least one horizontal or vertical path with a minimum sum of values by analyzing the initial map of values; and
a module to change a size of the image by adding or removing a path to or from the image using the searched path.

11. The image forming apparatus of claim 10, wherein the horizontal path is a chain of pixels where an initial pixel is on the left border of the image, a final pixel is on the right border of the image, and the quantity of pixels is equal to the width of the image of pixels,
wherein the vertical path is a chain of pixels where an initial pixel is on the top border of the image, a final pixel is on the bottom border of the image, and the quantity of pixels is equal to the height of the image of pixels.

12. The image forming apparatus of claim 10, further comprising:
a module to scale the image if a sum of pixel values of the paths is greater than or equal to a predetermined threshold.

13. The image forming apparatus of claim 10, wherein the module to change a size of the image comprises:
a module to add the searched path to the image; and
a module to remove the searched path from the image.

14. The image forming apparatus of claim 13, wherein the module to add the searched path adds at least one path by adding new pixels next to pixels of the searched path using interpolation by several nearest pixels, by weakening values in the map of history and updating the map of history, and updating values in the map of values.

15. The image forming apparatus of claim 13, wherein the module to remove the searched path removes at least one path by defining a path with a minimum sum of values, removing pixels of the path and correcting values of the pixels, thereby bordering with the pixels of the removed path, weakening values in the map of history and updating the map of history, and updating values in the map of value.

16. The image forming apparatus of claim 10, wherein the module to select a rule of calculation of function of value uses detecting a face image of people.

17. The image forming apparatus of claim 10, wherein the module to select a rule of calculation of function of value uses detecting city stages and architectural constructions.

18. The image forming apparatus of claim 10, wherein the generator uses a high frequency filter.

19. The image forming apparatus of claim 10, wherein the generator uses a function describing colors typical for human skin.

* * * * *